United States Patent
Lai et al.

(10) Patent No.: US 7,375,785 B2
(45) Date of Patent: May 20, 2008

(54) IN-PLANE SWITCHING LIQUID CRYSTAL DISPLAY DEVICE HAVING STORAGE CAPACITORS

(75) Inventors: Chao Chih Lai, Miao-Li (TW); Yun Shih Liu, Miao-Li (TW); Tsau Hua Hsieh, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 158 days.

(21) Appl. No.: 11/026,635

(22) Filed: Dec. 30, 2004

(65) Prior Publication Data

US 2005/0151913 A1  Jul. 14, 2005

(30) Foreign Application Priority Data

Jan. 13, 2004  (CN)  .................. 2004 1 0015202

(51) Int. Cl.
*G02F 1/1343* (2006.01)
(52) U.S. Cl. .................. 349/141; 349/38; 349/39
(58) Field of Classification Search ........ 349/141, 349/38, 39
See application file for complete search history.

(56) References Cited

U.S. PATENT DOCUMENTS

| 5,600,464 | A    | 2/1997 | Ohe et al. |
| 6,628,362 | B2   | 9/2003 | Seo et al. |
| 6,747,722 | B2 * | 6/2004 | Ono et al. .................. 349/141 |
| 6,774,956 | B2 * | 8/2004 | Ono et al. .................... 349/39 |

\* cited by examiner

*Primary Examiner*—David Nelms
*Assistant Examiner*—David Y. Chung
(74) *Attorney, Agent, or Firm*—Wei Te Chung

(57) ABSTRACT

An in-plane switching (IPS) liquid crystal display device (100) includes pixel units each having a storage capacitor. The storage capacitor is formed by a common electrode (112), a drain electrode (103), and a counter electrode (110). The common electrode is electrically coupled with the counter electrode. The counter electrode substantially covers the drain electrode, for shielding unexpected coupling effects on the drain electrode due to data signals on a data line (101) driving other pixels of the liquid crystal display device.

15 Claims, 2 Drawing Sheets

IN-PLANE SWITCHING LIQUID CRYSTAL DISPLAY DEVICE HAVING STORAGE CAPACITORS

BACKGROUND OF THE INVENTION

1. Field of the Invention

The present invention relates generally to a liquid crystal display device utilizing in-plane switching mode, and more particularly to such a liquid crystal display device having a storage capacitor.

2. Related Art

Liquid crystal displays have been burdened by limited viewing angles for many years. Many researchers in the art have invested huge amounts of time and effort in trying to find possible solutions for this shortcoming. One solution was developed by Masahito Ohe et al., and is disclosed in U.S. Pat. No. 5,600,464. This is the so-called liquid crystal display device with in-plane switching (IPS) mode.

In order for an IPS mode liquid crystal display device to have a higher aperture ratio, Seo et al. developed an "In-Plane Switching Mode Liquid Crystal Display Device Having a High Aperture Ratio," which is disclosed in U.S. Pat. No. 6,628,362 (the '362 patent). In particular, a storage capacitor having a reduced effective area for enlarging the aperture ratio is disclosed. Referring to FIG. 2B of the '362 patent, a circular mark 125 represents a group of electrodes, which are overlapped to form two storage capacitors. As shown, one storage capacitor is formed by a common electrode 109 and a data electrode 108, while the other storage capacitor is formed by the data electrode 108 and a gate electrode 101. However, due to the existence of unexpected coupling effects, such as a capacitive coupling effect, in a liquid crystal display device, especially in an IPS mode liquid crystal display device, the voltage of a pixel electrode is affected by data signals carried on a data signal line driving other pixels. This significantly reduces the quality of images displayed on the liquid crystal display device.

SUMMARY OF THE INVENTION

An objective of the present invention is to provide an IPS mode liquid crystal display device having a storage capacitor capable of shielding unexpected coupling effects.

In order to achieve the above objective, the present invention provides an in-plane switching liquid crystal display device that comprises a storage capacitor capable of shielding unexpected coupling effects such as a capacitive coupling effect. The liquid crystal display device comprises a substrate, a plurality of scanning lines, a plurality of data lines, and a plurality of thin film transistors. The scanning lines and the data lines are arranged on the substrate and cross each other thereby defining a plurality of pixel units. A first dielectric layer is interposed between the scanning lines and the data lines for mutual insulation. The thin film transistors are formed at crossing points of the scanning lines and the data lines. Each thin film transistor comprises a gate electrically coupling to the scanning line, a source electrically coupling to the data line, and a drain.

Each pixel unit comprises a common electrode, a drain electrode, and a counter electrode. The common electrode is formed on the substrate. The drain electrode is electrically coupled to the drain of the thin film transistor. A portion of the drain electrode is formed above a corresponding portion of the common electrode, with the first dielectric layer interposed between the drain electrode and the common electrode. A portion of the counter electrode is formed above a corresponding portion of the drain electrode, with a second dielectric layer interposed between the drain electrode and the counter electrode. The counter electrode is electrically coupled to the common electrode through a via. The common electrode, the counter electrode and the drain electrode cooperatively form a storage capacitor. In addition, the drain electrode is electrically coupled to the drain electrode through a via. The pixel electrode is arranged substantially parallel to the counter electrode, for generating electric fields substantially parallel to the substrate. The counter electrode substantially covers the drain electrode, for shielding any unexpected coupling effects between the drain electrode and the data lines.

BRIEF DESCRIPTION OF THE DRAWINGS

The present invention is better understood by referring to the detailed description of the preferred embodiment taken in conjunction with the drawings, wherein.

DETAILED DESCRIPTION OF THE INVENTION

Figure 1:
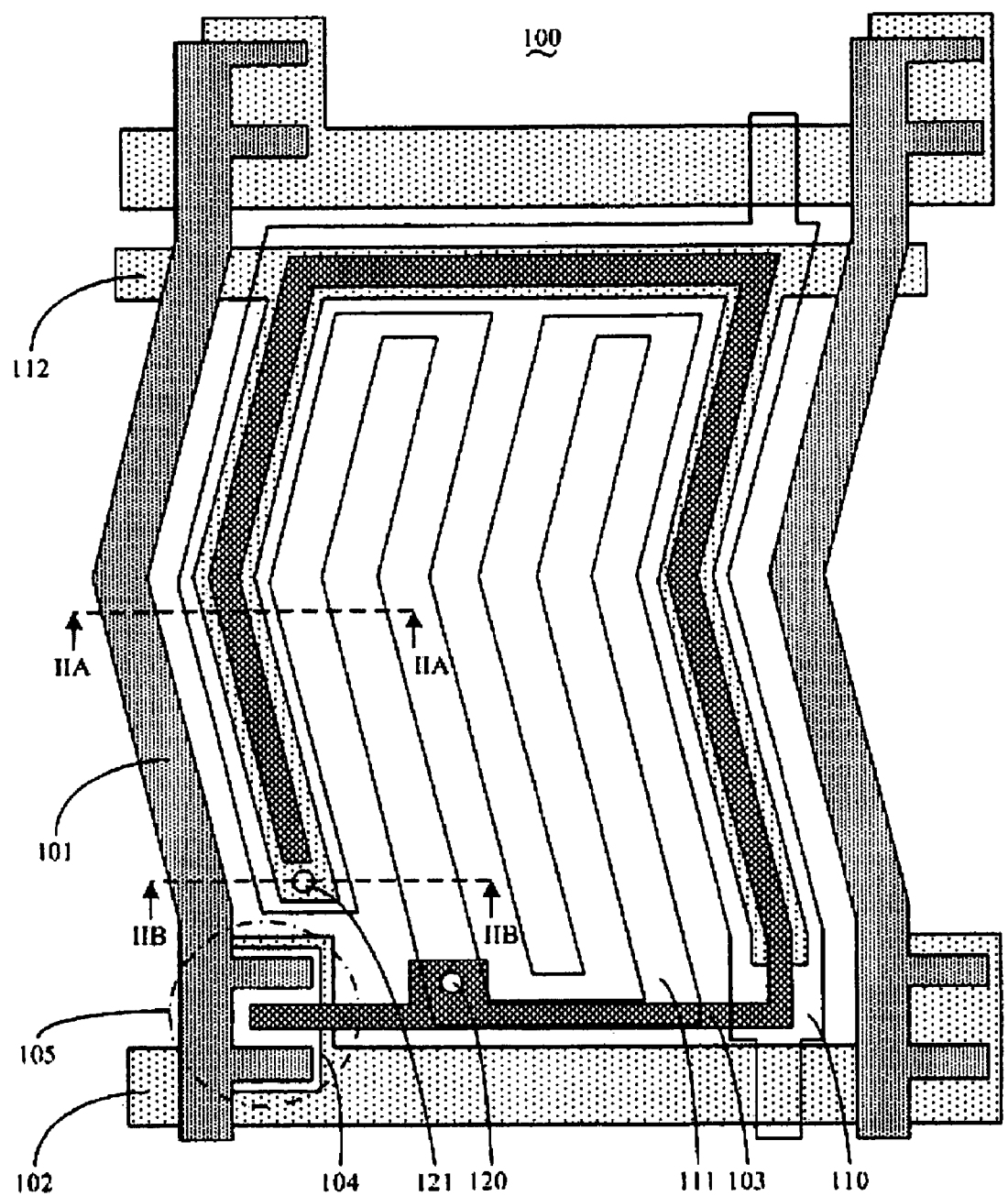
FIG. 1 is a top elevation illustrating a pixel unit of an IPS liquid crystal display device in accordance with one embodiment of the present invention, the pixel unit comprising a storage capacitor.
Figure 2A:
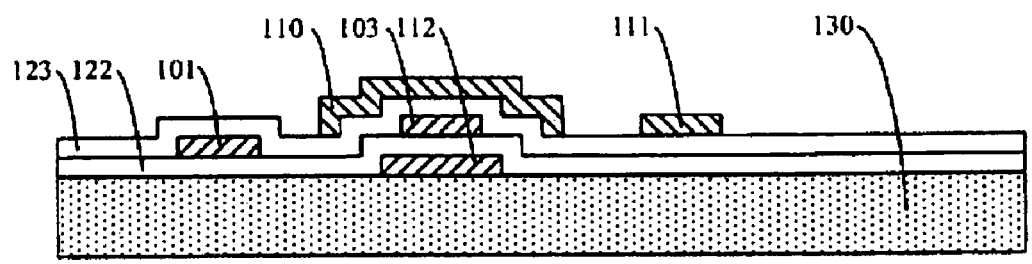
FIG. 2A is a cross-sectional view taken along line IIA-IIA of FIG. 1.
Figure 2B:
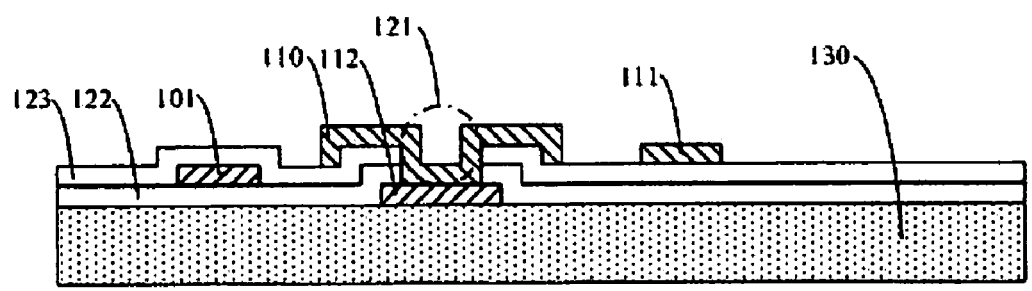
FIG. 2B is a cross-sectional view taken along line IIB-IIB of FIG. 1.

The present invention is hereinafter described in detail with reference to the accompanying drawings. FIG. 1 illustrates a pixel unit of an in-plane switching (IPS) liquid crystal display device, while FIG. 2A and FIG. 2B illustrate cross-sectional views taken along line IIA-IIA and line IIB-IIB of FIG. 1 respectively.

Referring to FIG. 1, a pixel unit of an IPS mode liquid crystal display device 100 is illustrated. Referring also to FIGS. 2A and 2B, the liquid crystal display device 100 comprises a plurality of data lines 101, a plurality of scanning lines 102, a first dielectric layer 122, a second dielectric layer 123, and a plurality of thin film transistors 105. The data lines 101 and the scanning lines 102 are arranged on a substrate 130, as shown in FIGS. 2A and 2B, and cross each other thereby defining a plurality of pixel units. The first dielectric layer 122 is interposed between the scanning lines 102 and the data lines 101 for mutual insulation. The thin film transistors 105 are formed at the crossing points of the scanning lines 102 and the data lines 101. Each of the thin film transistors 105 comprises a gate electrically coupling to the scanning line 102, a source electrically coupling to the data line 101, a drain and a channel interposing between the gate, and the drain and the source. In this particular embodiment, an amorphous-silicon (a-Si) film 104 is employed as the channel of the thin-film transistor 105. Other films, such as a poly-silicon film, may alternatively be employed as the channel of the thin-film transistor 105.

Each pixel unit of the liquid crystal display device 100 comprises a common electrode 112, a drain electrode 103, and a counter electrode 110. The common electrode 112 is formed on the substrate 130. The first dielectric layer 122 is formed on the common electrode 112 and the substrate 130.

The drain electrode 103 is formed on the first dielectric layer 122, such that a portion of the drain electrode 103 is formed substantially above a corresponding portion of the common electrode 112. The drain electrode 103 is electrically coupled to the drain of the thin film transistor 105. The second dielectric layer 123 is formed on the drain electrode 103. The counter electrode 110 is formed on the second dielectric layer 123, such that a portion of the counter electrode 110 is formed substantially above a corresponding portion of the drain electrode 103. The counter electrode 110 is electrically coupled to the common electrode 112 through a via 121. The common electrode 112, the counter electrode 110 and the drain electrode 103 cooperatively form a storage capacitor. In addition, the drain electrode 103 comprises a pixel electrode 111. In this particular embodiment, the pixel electrode 111 is electrically coupled to the drain electrode 103 through a via 120. In other embodiments, the pixel electrode 111 may be one part of the drain electrode 103. The pixel electrode 111 is arranged substantially parallel to the counter electrode 110, for generating electric fields substantially parallel to the substrate 130. As shown in FIG. 1, the counter electrode 110 in this particular embodiment is generally fork-shaped with three prongs, while the pixel electrode 111 is generally fork-shaped with two prongs corresponding to the prongs of the counter electrode 110. However, it will be appreciated that the counter electrode 110 and the corresponding pixel electrode 111 may be formed to have other suitable shapes.

Referring to FIG. 2A, the counter electrode 110 is formed to have a substantially larger area than that of the drain electrode 103, so that the counter electrode 110 substantially covers the drain electrode 103. With this configuration, unexpected coupling effects, such as a capacitive coupling effect, on the drain electrode 103 due to data signals being carried on the data line 101 for driving other pixels can be shielded. Therefore, a voltage applied to the drain electrode 103 can be stably maintained, and a voltage applied to the pixel electrode 111 is accordingly stably maintained. Thus, the liquid crystal display device 100 can achieve a steady display. Referring also to FIG. 2B, the counter electrode 110 is electrically coupled to the common electrode 112 through a via 121.

While the present invention has been described in detail with reference to the illustrated embodiment, it will be appreciated that no limitation to the present invention is intended by the above descriptions. Various equivalents of the preferred embodiment described above will be apparent to those with ordinary skill in the art, and it is therefore contemplated that the present invention be defined according to the following claims in their broadest meaning. Consequently, any modifications or alterations of the preferred embodiments are considered within the scope of the present invention.

What is claimed is:

1. A storage capacitor for an in-plane switching liquid crystal display device, comprising:
    a common electrode;
    a first dielectric layer covering said common electrode;
    a drain electrode disposed on said first dielectric layer above said common electrode, said drain electrode being electrically coupled to a pixel electrode;
    a second dielectric layer covering said drain electrode and said first dielectric layer; and
    a counter electrode disposed on said second dielectric layer above said drain electrode, said counter electrode being arranged substantially parallel to said pixel electrode for generating in-plane switching mode electric fields, being electrically coupled to said common electrode, and substantially covering said drain electrode for shielding unexpected coupling between said drain electrode and an associated data line.

2. The storage capacitor as recited in claim 1, wherein said counter electrode and said common electrode are electrically coupled through a via.

3. An in-plane switching liquid crystal display device comprising:
    a substrate;
    a plurality of scanning lines and a plurality of data lines arranged on said substrate and crossing each other thereby defining a plurality of pixel units, wherein a first dielectric layer is interposed between the scanning lines and the data lines for mutual insulation; and
    a plurality of thin film transistors formed at crossing points of the scanning lines and the data lines, each of the thin film transistors comprising a gate electrically coupled to a corresponding one of the scanning lines, a source electrically coupled to a corresponding one of the data lines, and a drain;
    wherein each of the pixel units comprises:
    a common electrode;
    a drain electrode electrically coupled to the drain of the thin film transistor, a portion of said drain electrode being arranged above a corresponding portion of said common electrode, wherein the first dielectric layer is interposed between said drain electrode and said common electrode; and
    a counter electrode electrically coupled to said common electrode and substantially covering said drain electrode for shielding unexpected coupling between said drain electrode and the corresponding data line, wherein a second dielectric layer is interposed between said drain electrode and said counter electrode.

4. The liquid crystal display device as recited in claim 3, wherein said drain electrode further comprises a pixel electrode.

5. The liquid crystal display device as recited in claim 4, wherein said pixel electrode is arranged substantially parallel to said counter electrode for generating electric fields substantially parallel to said substrate.

6. The liquid crystal display device as recited in claim 3, wherein said common electrode and said counter electrode are electrically coupled through a via.

7. The liquid crystal display device as recited in claim 6, wherein said common electrode, said counter electrode and said drain electrode cooperatively form a storage capacitor.

8. An in-plane switching liquid crystal display device including:
    pixel units each having a storage capacitor, said storage capacitor formed by a common electrode, a dram electrode, and a counter electrode wherein the common electrode is electrically coupled with the counter electrode and the counter electrode substantially covers the drain electrode for shielding unexpected coupling effects on the drain electrode due to data signals on a data line driving other pixels of the liquid crystal display device.

9. The storage capacitor as recited in claim l, wherein said counter electrode has a substantially larger area than that of said drain electrode.

10. The storage capacitor as recited in claim 1, wherein said counter electrode is generally fork-shaped with three prongs.

11. The storage capacitor as recited in claim 10, wherein said pixel electrode is generally fork-shaped with two prongs corresponding to the prongs of said counter electrode.

12. The storage capacitor as recited in claim 1, wherein said pixel electrode is one part of said drain electrode.

13. The liquid crystal display device as recited in claim 3, wherein said counter electrode has a substantially larger area than that of said drain electrode.

14. The liquid crystal display device as recited in claim 4, wherein said counter electrode is generally fork-shaped with three prongs.

15. The liquid crystal display device as recited in claim 14, wherein said pixel electrode is generally fork-shaped with two prongs corresponding to the prongs of said counter electrode.

* * * * *